United States Statutory Invention Registration [19]

[11] Reg. Number: H211

Vanderbeck [43] Published: Feb. 3, 1987

[54] COMBINED EJECTOR-RAMMER FOR SMALL ARMS

[75] Inventor: William E. Vanderbeck, Ridgefield Park, N.J.

[73] Assignee: The United States of America as represented by the Secretary of the Army, Washington, D.C.

[21] Appl. No.: 730,214

[22] Filed: May 3, 1985

[51] Int. Cl.[4] ..... F41C 15/00; F41C 13/00

[52] U.S. Cl. ..... 42/17; 42/25

[58] Field of Search ..... 42/16, 17, 25

[56] References Cited

U.S. PATENT DOCUMENTS 1,178,468 4/1916 Hartigan ..... 42/25

*Primary Examiner*—David H. Brown
*Assistant Examiner*—Michael Carone
*Attorney, Agent, or Firm*—Anthony T. Lane; Harold H. Card, Jr.; Michael C. Sachs

[57] ABSTRACT

This combined ejector-rammer, or ejectomer, is a single mechanical device which performs the functions of both an ejector and a rammer for small arms which use cartridge type ammunition. An ejectomer lever is attached to the side of the weapon's bolt by means of a pair of pins and a spring. The pins move in elongated slots in the lever, one of which is linear and the other L-shaped. The forward end of the lever acts as a rammer to push each fresh round up a ramp into the firing chamber. After firing, a conventional extractor removes the spent cartridge case from the chamber and as the spent case moves down the ramp, the spring and the pins cause the lever to move in such a way that the extracted case is ejected.

5 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMBINED EJECTOR-RAMMER FOR SMALL ARMS

The invention described herein may be manufactured, used, and licensed by or for the Government for governmental purposes without the payment to me of any royalties thereon.

BACKGROUND OF THE INVENTION

Small caliber weapons which fire conventional cased ammunition require some means for removing the fired cartridge cases from the firing chamber and for inserting therein a fresh cartridge in preparation for the next firing of the weapon. In the prior art, such weapons have included a reciprocating bolt which forms the rear closure of the chamber during firing and which moves rearward after firing to permit extraction and ejection of the fired or spent cartridge case and the insertion or ramming into the chamber of a fresh round or cartridge. The extraction of the spent cartridge case is usually accomplished by means of a hook-shaped piece called an extractor, which hooks into a groove at the rear of the cartridge case. As the bolt reciprocates to the rear after firing, the spent cartridge case is removed from the chamber. After extraction the spent case is ejected from the weapon, usually in the prior art by means of a separate mechanical device such as a plunger or arm which may be spring loaded or otherwise actuated. Such a device is called an ejector. Also, some means must be provided for pushing the fresh round from the feed mechanism into the chamber. Such devices are often called rammers.

The present invention comprises a single mechanical unit which performs both the ejector and rammer functions described above. This single unit will be referred to as an "ejectomer" to denote its dual function.

SUMMARY OF THE INVENTION

The invention comprises a more or less conventional bolt of the type described above with an ejectomer lever attached thereto by means of a pair of pins and a spring. The pins move in elongated slots, one of which is linear and the other L-shaped. The forward end of the lever is arranged to act as a rammer to push each fresh cartridge into the firing chamber. During ramming, the cartridge moves up a ramp. After firing, a conventional extractor attached to the bolt removes the spent cartridge case from the chamber as the bolt assembly retracts to the rear. The combined action of the aforementioned spring and the two elongated slots causes the extracted cartridge case to be ejected as the bolt moves rearwardly after the cartridge is fired. The spring-loaded lever then continues its rearward movement and it passes over the next round which has been positioned at the base of the ramp by the feed mechanism. The device is then ready for the next cycle of operation which begins with the ramming of the fresh cartridge into the chamber.

It is thus an object of the invention to provide a novel mechanism which is capable of both ramming cartridges into the firing chambers of small caliber weapons prior to the firing thereof and also ejecting spent cartridge cases from said firing chamber following the firing thereof.

Another object of the invention is to provide a single mechanical device for a small weapon which is capable of performing the functions of a conventional bolt, a rammer, an extractor and an ejector.

A further object of the invention is to provide an improved and simplified mechanism for small arms which utilize cartridge type ammunition, which mechanism rams cartridges into the firing chamber of the weapon, extracts the spent cartridge case from said chamber after firing, ejects the case from the weapon, and then rams a fresh cartridge into said firing chamber preparatory to another firing of said weapon.

Another object of the invention is to provide an improved loading, extraction and ejection mechanism for small arms which utilize cartridge-type ammunition.

These and other objects and advantages of the invention will become apparent from the following detailed description and the drawings.

BRIEF DESCRIPTION OF THE DRAWINGS

FIG. 1 shows a fresh round about to be rammed into the firing chamber.

FIG. 2 shows the bolt assembly almost fully forward and the round fully inserted in the chamber.

FIG. 3 shows the round ready for firing.

FIG. 4 shows the spent cartridge case being ejected from the weapon.

FIG. 5 shows the mechanism retracting over a fresh round.

DETAILED DESCRIPTION OF A PREFERRED EMBODIMENT

Figure 1:
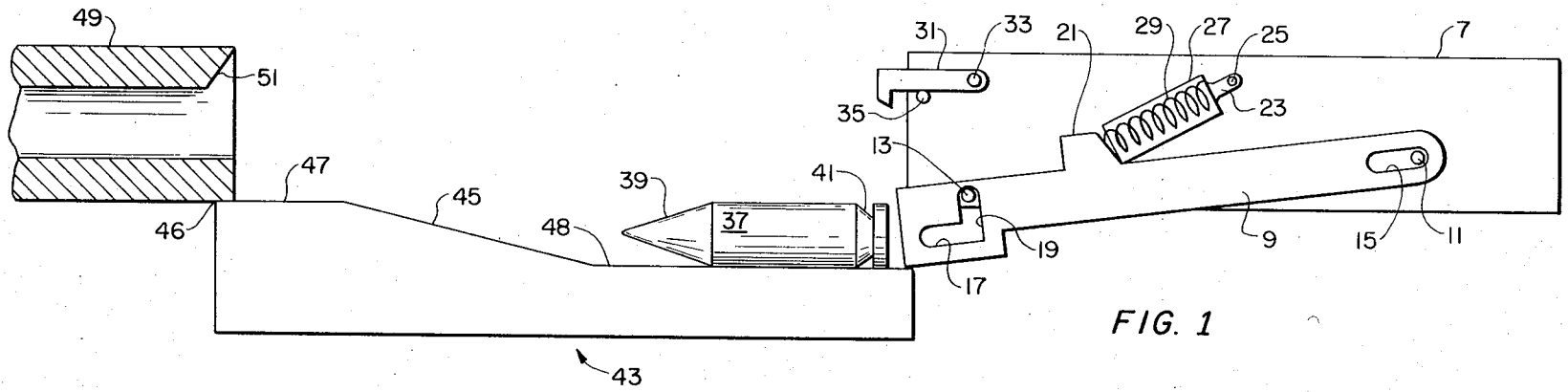
FIGS. 1–5 show the novel mechanism of the invention in different stages of its operation.

The drawings are simplified representations of an illustrative embodiment of the invention. In all of the figures, the gun barrel is shown in vertical cross section, with a recessed portion 51 at the upper aft end thereof for accommodating the extractor hook 31, which is attached to the bolt by means of pin 33. The hook 31 pivots on pin 33, which is rigidly attached to bolt 7. The pin 35 in the bolt functions as a stop for the extractor hook. Below and aft of the barrel is the feed ramp 43 which comprises a pair of level surfaces 47 and 48 connected by a sloping surface 45. The feed ramp may be attached to the lower edge of the barrel at 46 by any suitable means. The rear portion of the barrel 49 shown in the drawings comprises the firing chamber which contains the cartridge (or round) during firing.

The bolt 7 forms the rear closure for the chamber during firing and it carries the other parts of the bolt assembly with it. These other parts of the bolt assembly are the aforementioned extractor hook 31, the front and rear pins 13 and 11, respectively, on which the ejectomer lever 9 is mounted, the spring 29 together with its housing 27, its mounting lug 23 and its mounting pin 25. The front and rear pins 13 and 11 are mounted in the left side of the bolt in the illustrative example of the drawings. The function of the pins is to constrain and control the movement of the ejectomer level 9 in conjunction with the elongated slots 15, 17 and 19, and the spring 29.

The spring 29 is mounted in a cylindrical housing 27 which has a mounting lug 23 at one end thereof and which is open at the other end so that the spring 29 can exert pressure on the slanted surface of lug 21, which is an integral part of the lever 9. The spring and its housing are connected to the bolt 7 by means of pin 25, which passes through lug 23. Pin 25 is rigidly attached to the bolt 7 and the spring and its housing pivot around it. As can be seen from the drawings, the spring and lug 21 are angled to simultaneously urge the ejectomer lever 9 downward and forward with respect to the bolt.

FIG. 1 shows the weapon parts in their relative positions at the start of an operating cycle, with the chamber empty and a new round 37 positioned on the lower, level portion 48 of the feed ramp 43. The bolt 7 is in its rearmost, or fully retracted position. The lever 9 has two elongated slots therein. The rear slot 15 is a linear one and extends parallel to the longitudinal dimension of the lever 9, or generally parallel to the fore and aft axis of the weapon. The forward slot is L-shaped and comprises two linear sub-slots 17 and 19 at right angles to each other with sub-slot 17 being parallel to slot 15 and sub-slot 19 being perpendicular thereto. The pins 11 and 13 may be headed so that the lever 9 is prevented from falling off of the bolt. In FIG. 1, the spring causes the ejectomer lever to assume the position shown, which is its lowermost position, constrained by the pins 11 and 13 in their respective slots. It can be seen that as the bolt is moved to the left to begin the loading operation, the ejectomer lever will slide along the surface of the feed ramp and push the round 37 toward the firing chamber at the rear end of barrel 49. While the bolt is moving forward, the front end of the ejectomer lever is raised relative to the bolt as a result of its contact with the sloping portion 45 of the feed ramp.

Figure 2:
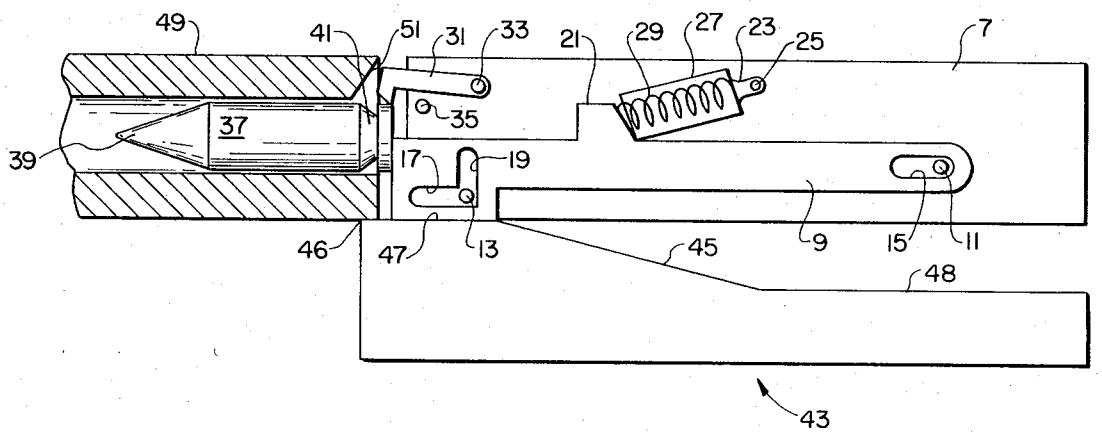

In FIG. 2, the round has been fully seated in the firing chamber by the ramming action of the ejectomer lever, but the bolt is not fully forward. As can be seen, the forward pin 13 is at the aft end of the sub-slot 17, and the extractor hook 31 has not yet engaged the groove 41 at the aft end of cartridge 37.

Figure 3:
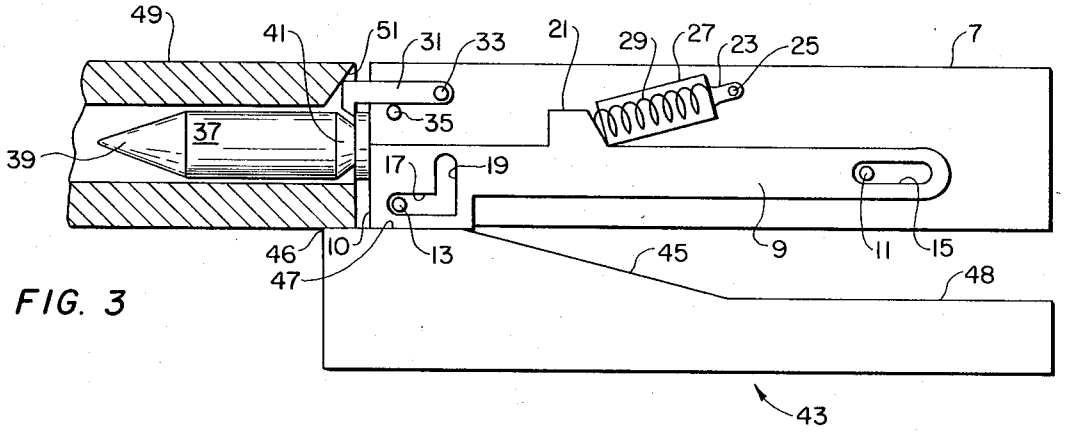

FIG. 3 shows the mechanism in position for the firing of the round. This figure is similar to FIG. 2 except that the bolt 7 is now fully forward and the forward edge, 10, of the lever 9 is flush with the forward edge of the bolt. The forward motion of the bolt 7 relative to the lever 9 has moved the two pins 11 and 13 to the forward (or left) ends of the slots 15 and 17, respectively. Also, the additional forward movement of the bolt has permitted the extractor hook 31 to engage the groove 41. It should be noted that in FIG. 3 the lever 9 is being biased against the rear of the round 37 by spring 29. Thus when the bolt assembly starts to retract, the lever 9 is free to move forward relative to the bolt.

The round is fired by means of a firing mechanism which is not shown, but which may include a firing pin mounted in the bolt and arranged to strike the primer in the aft end of the cartridge.

Figure 4:
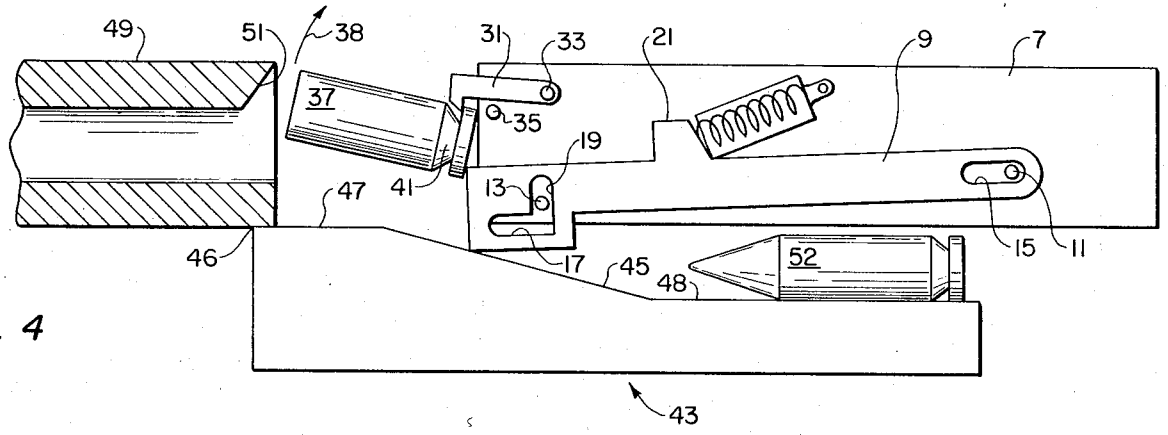

FIG. 4 shows the bolt assembly as it is being retracted after the firing of projectile or bullet 39. A fresh round 52 has been fed to the base 49 of the feed ramp by the feeding mechanism, not shown. As soon as the front end of the fired case being extracted is clear of the aft end of the barrel, the spring 29 forces the ejectomer lever to move forward relative to the bolt, thus spinning the fired cartridge case 37 around the pivot formed by the extractor hook 31. The direction of this spin is indicated by the curved arrow 38. The front pin 13 moving in the sub-slots 17 and 19 prevents the lever 9 from moving downward until it has moved fully forward, relative to the bolt. After completion of this relative forward movement, the ejectomer lever can start to follow the feed ramp 45 back down under the pressure of the spring, with the vertical slot 19 moving down relative to pin 13.

Figure 5:
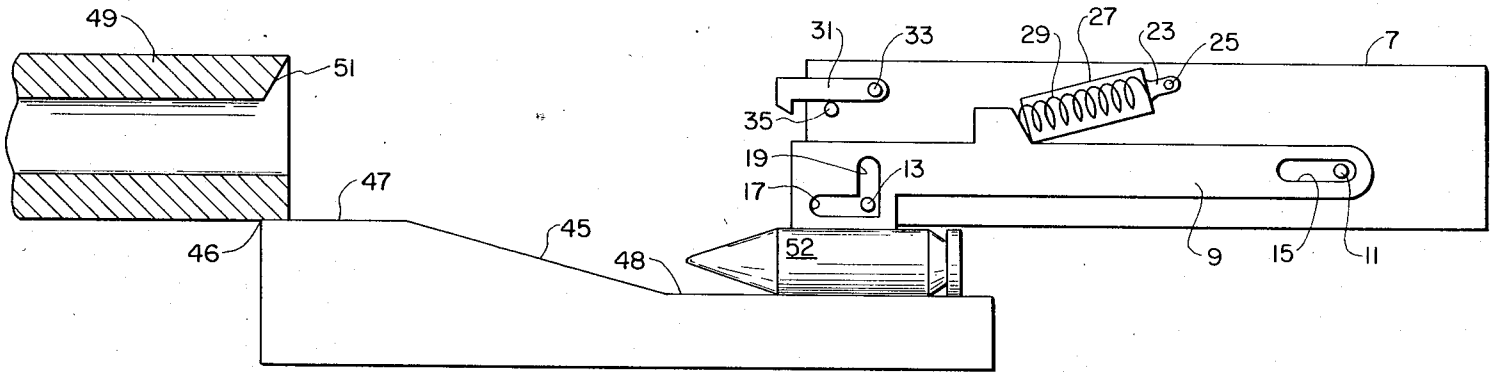

In FIG. 5, the ejectomer lever has been forced upward against the pressure of the spring as it passes over the fresh round 52. When the bolt assembly reaches its fully retracted position the lever will have passed over fresh round and the parts will be in the positions shown in FIG. 1, ready for a repetition of the operating cycle.

It should be noted that the term "forward" as used herein means toward the muzzle of the weapon and "aft" or "rearward", away therefrom. Lower means below the fore and aft axis of the weapon when it is in the horizontal position.

While the invention has been described in connection with an illustrative embodiment, obvious variations therein will occur to those skilled in the art without the exercise of invention, accordingly the invention should be limited only by the scope of the appended claims.

What is claimed is:

1. A mechanical device for a small caliber weapon which device is capable of performing the functions of a conventional bolt, a rammer, an extractor and an ejector, said weapon comprising a firing chamber, a feed ramp located rearwardly and below said firing chamber, a bolt assembly adapted to reciprocate above said feed ramp, one side of said bolt having an ejectomer lever attached thereto by means of a pair of pins mounted in said bolt and a spring which simultaneously urges said lever downwardly and forwardly relative to said bolt, one of said pins being located near the forward end of said bolt and moving in an L-shaped slot in said lever and the other of said pins being located near the aft end of said bolt and moving in a generally horizontal linear slot in said lever, whereby the forward end of said lever functions as a rammer to slide cartridges along said feed ramp and into said chamber and whereby during retraction of said bolt assembly following firing, said lever will move forward relative to said bolt as a result of the pressure of said spring and the sliding of said pins in said slots to eject spent cartridge cases from said weapon, and wherein said bolt has an extractor hook attached thereto.

2. The device of claim 1 wherein said spring is mounted in a hollow cylindrical housing which pivots around a pin in said bolt, and said spring bears up against a slanted lug on said lever to urge said lever downward and forward with respect to said bolt.

3. The device of claim 1 wherein said extractor hook is arranged to engage a groove in the aft end of said cartridge, whereby the retraction of said bolt assembly following firing will extract the spent cartridge cases from said firing chamber.

4. An ejectomer for a small weapon which utilizes cartridge-type ammunition, said weapon comprising a firing chamber, a feed ramp extending to the rear and below said firing chamber, and a bolt, said ejectomer comprising a lever which is attached to said bolt by means of a pair of pins in said bolt which move in separate slots in said lever and a spring which pivots around a pin in said bolt and urges said lever downwardly and forwardly relative to said bolt, and wherein the forward end of said lever is arranged to ram cartridges along said feed ramp and into said firing chamber, and during retraction of said bolt the force of said spring and the movement of said lever as a result of said pair of pins moving in said slots causes said lever to move forward relative to said bolt and thereby causing spent cartridge cases extracted from said firing chamber to be ejected from the weapon.

5. The ejectomer of claim 4 wherein the forward one of said slots is L-shaped and the rearward one of said slots is linear.

* * * * *